(12) United States Patent
Lazarev et al.

(10) Patent No.: US 7,113,337 B2
(45) Date of Patent: Sep. 26, 2006

(54) MULTILAYER OPTICAL COATING

(75) Inventors: Pavel I. Lazarev, Belmont, CA (US); Michael V. Paukshto, Foster City, CA (US)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/483,193

(22) PCT Filed: Jul. 10, 2002

(86) PCT No.: PCT/US02/23291

§ 371 (c)(1),
(2), (4) Date: Jun. 25, 2004

(87) PCT Pub. No.: WO03/007025

PCT Pub. Date: Jan. 23, 2003

(65) Prior Publication Data

US 2004/0233528 A1  Nov. 25, 2004

(30) Foreign Application Priority Data

Jul. 10, 2001  (RU) ............................. 2001118989

(51) Int. Cl.
*G02B 5/30* (2006.01)

(52) U.S. Cl. ............... 359/498; 359/492; 359/586; 359/589

(58) Field of Classification Search ............ 359/483, 359/485, 490, 491, 492, 494, 497, 498, 580, 359/582, 586, 588, 589; 427/162, 163.1, 427/163.2, 163.3, 163.4, 164, 165, 166, 167, 427/168, 169

See application file for complete search history.

(56) References Cited

U.S. PATENT DOCUMENTS

| | | | |
|---|---|---|---|
| 5,007,942 A | 4/1991 | Claussen et al. | ................ 8/506 |
| 2001/0029638 A1* | 10/2001 | Bobrov et al. | ................. 8/506 |
| 2004/0265510 A1* | 12/2004 | Miroshin et al. | ........... 428/1.31 |

FOREIGN PATENT DOCUMENTS

| | | |
|---|---|---|
| RU | 2155978 A1 | 9/2000 |
| WO | WO 95/17691 A1 | 6/1995 |
| WO | WO 99/31535 A1 | 6/1999 |
| WO | WO 9931535 A1 * | 6/1999 |
| WO | WO 03/007025 A3 | 1/2003 |

\* cited by examiner

OTHER PUBLICATIONS

Y. A. Bobrov, 'Dependence of the anisotropic absorption coefficient on the thickness of molecularly oriented organic dye films', J. Opt. Technol., vol. 66, No. 6, Jun. 1999, pp. 547-549.*

*Primary Examiner*—Thong Nguyen
*Assistant Examiner*—Arnel C. Lavarias
(74) *Attorney, Agent, or Firm*—Dorsey & Whitney LLP

(57) ABSTRACT

Anisotropic multilayer thin-film coating that may be used in fabrication of various optical elements, such as polarizers, beam splitters, interference-polarizing light filters, polarizing mirrors, etc. The invention is aimed at creating a multilayer optically anisotropic structure, which contains at least one layer with high degree of anisotropy and perfect structure, whereas refraction indexes and thicknesses of all layers and their combination is selected according to the known law, determined by the purpose of the structure, such as to provide an interference extremum for at least one polarization of light. The technical result is the increase of effectiveness of transforming incident radiation, which corresponds to the functional purpose of the multilayer optically anisotropic structure, due to the high reproducible degree of amsotropy of at least one layer in the structure.

13 Claims, 4 Drawing Sheets

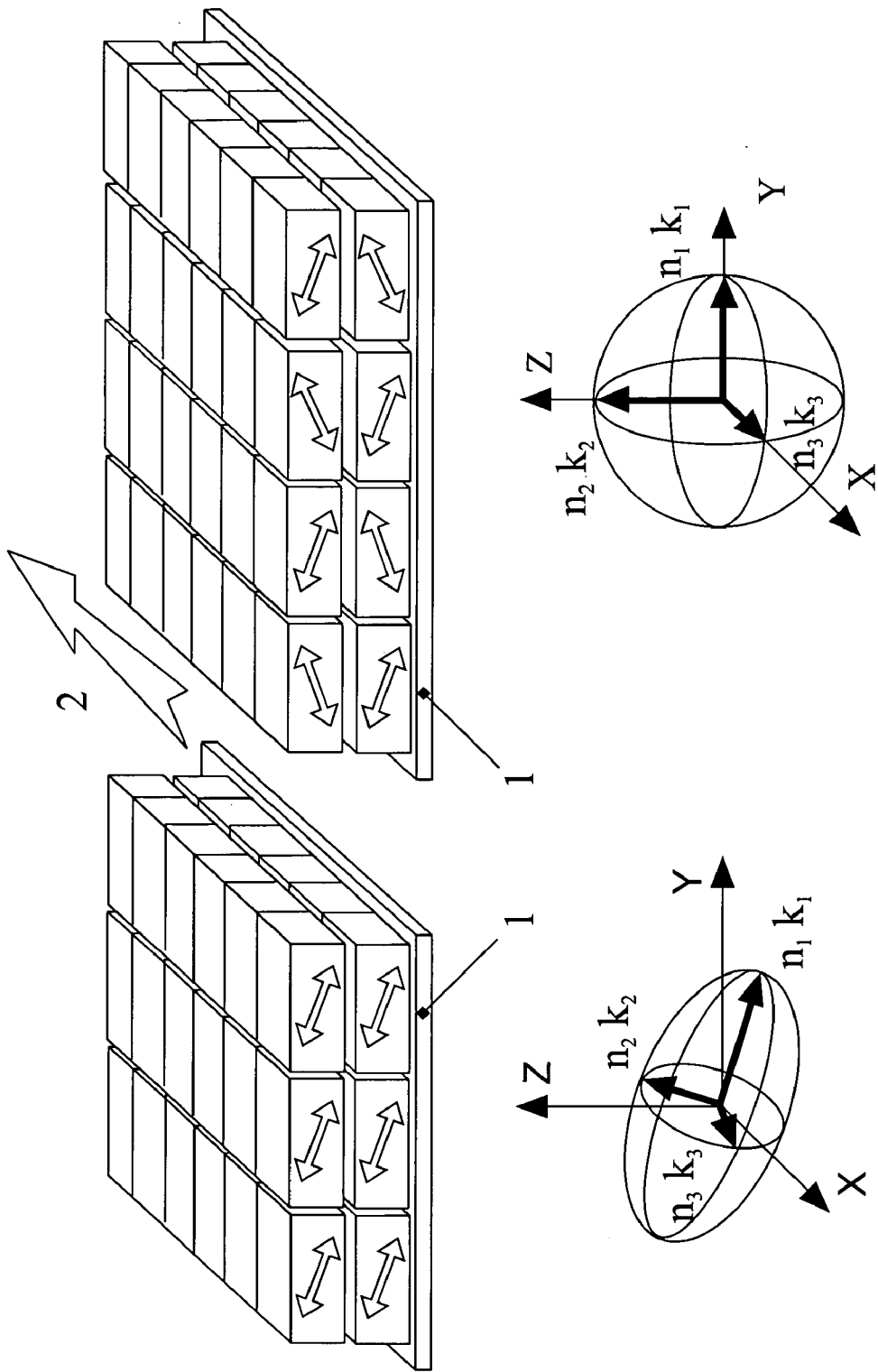

MULTILAYER OPTICAL COATING

FIELD OF INVENTION

The invention pertains to anisotropic multiplayer thin-film coatings and may be used in fabrication of various optical elements, such as polarizers, beam splitters, interference-polarizing light filters, polarizing mirrors, etc.

BACKGROUND OF THE INVENTION

The currently utilized polarizers represent polymer films oriented by uniaxial stretching and colored with organic dyes or iodine compounds. Polyvinyl alcohol is usually used as the polymer (PVA) in these films [U.S. Pat. No. 5,007,942]. Additional layers in such a polarizer, for example, a layer of lacquer, perform protective and other functions and are not intended for optimization of transmission of light through the polarizer (or reflection of light—for a reflecting polarizer) from the point of view of light interference.

There is a known polarizer [WO 95/17691], which represents a multilayer structure comprising at least one birefringent layer with the thickness, which provides interference extremum at the exit of the optical polarizer, for at least one linearly polarized component of light. This polarizer comprises alternating layers of two transparent (non-absorbing in the working range of wavelengths) polymer materials, one of which is birefringent, and the other—optically isotropic. The birefringence in the polymeric material is obtained via stretching it in one direction by 2–10 times.

The working principle of such polarizer is in the following: one linearly polarized component of light, to which corresponds the extraordinary (larger) refraction index of the birefringent layer, is significantly reflected from the multilayer optical polarizer due to the difference in the refraction indexes at the boundaries between the isotropic and the anisotropic layers. With the corresponding choice of the layers' thickness and refraction indexes the optical path difference between the wavelengths reflected from the boundaries of layers comprises a whole number of wavelengths, i.e. there is interference maximum. In this case, reflection of the linearly polarized component of light, to which corresponds the extraordinary (larger) refraction index of the anisotropic layer significantly increases.

The ordinary (smaller) refraction index of the anisotropic layer is chosen close to the refraction index of the isotropic layer, therefore the other linearly polarized component of the incident light, to which corresponds the ordinary (smaller) refraction index, travels through the multilayer optical polarizer without reflections.

Thus, upon incidence of an unpolarized light onto the known polarizer, one linearly polarized component of light is reflected, while the other passes through practically without losses (in essence, the polarizer functions as a beam splitter).

Multilayer polarizer may also contain additional dichroic polarizer (with weak absorbance), axis of which is parallel to the axis of the reflecting polarizer. The role of the dichroic polarizer is basically to remove reflections of the external light when such combination polarizer works "in transmission".

One of the drawbacks of the known multilayer polarizer is the necessity to use large number of alternating layers, due to the low degree of anisotropy (the deference between the ordinary and extraordinary refraction indexes) in the transparent polymer materials. Usually this value does not exceed 0.2. Therefore, coefficient of reflection from the boundaries of layer is small, and to obtain high coefficient of reflection in general one needs 100–600 layers, deposition of which poses difficult technical challenge and requires special precision equipment.

There is a known polarizer [WO 99/31535], comprising at least one anisotropically absorbing layer, at least one refraction index of which increases with the wavelength. To increase effectiveness of light polarization, it has been suggested to use multilayer polarizer, in which the thickness of layers and their refraction indexes are selected such as to provide interference extremum for at least one linearly polarized component of light. This is the so-called "interference-type" polarizer. Anomalous dispersion of at least one refraction index of the anisotropic layer allows to effectively polarize light in a wide spectral range. In the capacity of the material of the anisotropic layer, it has been suggested to use corresponding dichroic dyes, their mixtures and dyes with various modifying additives. The degree of anisotropy of these materials is significantly higher, than of the stretched polymer films. However, the modern level of technological development, in particular displays, requires obtaining coatings with higher degree of anisotropy and perfect structure.

Patent [RU 2155978] describes polarizers comprising a film of dichroic organic material, molecules of which or fragments of molecules of which have flat structure and at least a part of the film has crystalline structure. In particular, such films may be fabricated from various dyes and their mixtures. Crystalline structure of these films allows obtaining high degree of anisotropy and homogeneity of optical characteristics.

However, experiments have shown that such films are hygroscopic and require additional protection or processing to modify their chemical properties. For this purpose, in particular, the already finished films are processed with ions of the 2x and 3x valence metals.

Optical characteristics of the known films are determined by the order parameter, which in this case is the averaged characteristic, not accounting for the particular situation of the optical axes of the crystalline structure relative to the substrate, which in turn, imposes restrictions on the possibility to obtain structures "film-substrate" with the given optical properties.

Other literature also describes other multilayer structures with an optically anisotropic layer, having other (not limited only to the polarizing light) functional purpose. For example, interference-polarizing (IFP) light filters, operation of which is based on interference of the polarized rays [Gvozdeva et al., Fisichaskaya optika, M.: Mashinostroenie, 1991]. The peculiarity of these filters is in the possibility to extract very narrow spectral ranges (up to $10^{-2}$ nm) without any background noise. Often to fabricate separate layers of IFP, one uses thin plates of various crystals, for example crystalline quartz or Iceland spar.

SUMMARY OF THE INVENTION

The herein invention is aimed at creating a multilayer optically anisotropic structure, which comprises at least one layer with high degree of anisotropy and perfect structure, while refraction indexes and thicknesses of all layers and their combination is selected according to the known law, according to the purpose of the structure, such as to provide interference extremum for at least one polarization of light. The purpose of such multilayer optically anisotropic structure is not limited to only the functions of "traditional polarizers".

By depositing alternating dielectric films with high and low refraction indexes and with the necessary optical thickness (usually equal to or divisible by λ/4), including also at least one optically anisotropic layer, on the surface of the substrate, one may obtain the following main interference coatings for at least one linearly polarized component of light:

antireflecting—lowering reflection for the narrow or wide range of the spectrum;

mirror-like—increasing reflection of the incident light up to 80–95% and more;

interference light filters—extracting spectral regions of various width from the continuous spectrum of the radiation; etc. [Gvozdeva et al., Fisichaskaya optika, M.: Mashinostroenie, 1991].

The technical result of the herein disclosed invention is the increase of effectiveness of transformation of the incident radiation, according to the functional purpose of the multilayer optically anisotropic structure, due to the reproducible high degree of anisotropy of at least one layer in the structure. Selection of the material of the anisotropic layer from the wide spectrum of organic compounds and their mixtures, which form stable lyotropic liquid crystal phase, allows obtaining crystalline layer with certain, predetermined ratio of the main values of axes of the ellipse of the imaginary and real parts of the refraction coefficient. Technical result of the invention is also the simultaneous enhancement of durability and shelf life of this structure, while maintaining or reducing its thickness, optimization of the multilayer structure, simplification of its design and method of obtaining due to possibility of selecting materials with the required optical characteristics for separate layers and control of their thickness, as well as manufacturability and ecological safety of at least a part of manufacturing operations.

When using two or more anisotropic crystalline layers in the mentioned structure with the said ratio of the main values of axes of the ellipse of the imaginary and real parts of the refraction index of the layers, besides the simple final result there is an additional effect, resulting from the combination of the crystal lattices of the said layers, which enhances angular distribution of effectiveness of transformation of the incident radiation.

The necessary component of the disclosed structure, which determines anisotropy of its properties, is the optically anisotropic, at least partially crystalline, layer. The initial selection of material for fabrication of such a layer is determined by the presence of developed system of η-conjugate bonds in the aromatic conjugate cycles, and the presence in molecules groups like amine, phenol, cetonic, etc., situated within the plane of molecules and being a part of the aromatic system of bonds. The molecules themselves or their fragments have flat build. For example, this could be organic materials such as indanthrone (Vat Blue 4), dibenzoimidazole 1,4,5,8-naphthalenetetracarboxilic acid (Vat Red 14), dibenzoimidazole 3,4,9,10-perylentetracarboxilic acid, quinacridone (Pigment Violet 19) and others, derivatives of which as well as their mixtures form stable lyotropic liquid crystal phase.

When dissolving such an organic compound in the appropriate solvent, there forms a colloid system (liquid crystal solution), where molecules aggregate into supramolecular complexes, which represent kinetic units of the system. Liqiuid crystal (LC) appears as the pre-ordered state of the system, from which through the process of alignment of the supramolecular complexes and subsequent removal of the solvent, the anisotropic crystalline film (or in other words membranous crystal) is created.

The method of obtaining thin anisotropic crystalline films from colloid systems with supramolecular complexes comprises:

deposition of this colloid system onto the substrate (or a ware, or one of the layers of the multilayer structure); colloid system should also be thixotropic, for which purpose the colloid system should be at a certain temperature and have certain concentration of the dispersion phase;

transformation of the deposited or depositing colloid system into the state of increased fluidity via any kind of external influence, providing lowered viscosity of the system (this may be heating, shear deformation, etc.); external influence may continue during the entire subsequent process of alignment or take up the appropriate amount of time so that the system did not have enough time to relax into the state of higher viscosity during the time of alignment;

external aligning influence on the system, which may be performed as mechanically, as well as with any other method; the degree of this influence should be sufficient so that the kinetic units of the colloid system obtain the necessary orientation and form the structure, which will be the basis for the future crystalline lattice of the forming layer;

conversion of the aligned region of the forming layer from the state with lowered viscosity, which was achieved by the initial external influence, into the state with the original or even higher viscosity of the system; this is performed in such a way that no disorientation of the structure of the forming layer would take place and no defects on its surface would appear;

the concluding operation is the drying (removal of the solvent), in the process of which the crystalline structure of the layer is formed.

In the obtained layer, the planes of molecules are parallel to each other, and molecules form three-dimensional crystal, in at least a part of the layer. Upon optimization of this method of fabrication, one can obtain mono-crystalline layers. Optical axis in the crystal will be perpendicular to the planes of molecules. Such a layer will possess high degree of anisotropy and high refraction index in at least one direction.

Optical anisotropy of the said layer is described by ellipses of the imaginary and the real parts of the refraction index, which characterize the angular dependence of the absorption and refraction coefficients, accordingly (the imaginary and the real parts of the anisotropic refraction index). The following relationships should simultaneously hold for the components of the imaginary and the real parts of the refraction index of the optically anisotropic layer according to the invention:

$$K_1 \geq K_2 > K_3,$$

$$(n_1+n_2)/2 > n_3.$$

Components of the real and imaginary parts of the anisotropic refraction index, as well as the direction of the axes of the ellipse may be experimentally determined by existing ellipsometry or spectrophotometry methods.

Providing the necessary anisotropy of the absorption and refraction coefficients, as well as orientation of the main axes, i.e. optical properties of the anisotropic crystalline layer in a multilayer structure is possible via imposing a certain angular distribution of molecules in the polarizing film on the surface of the substrate.

It is possible, also, to mix colloid systems (in this case mixed supramolecular complexes will form in solution) to obtain layers with intermediate optical characteristics. Absorption and refraction in layers with intermediate optical characteristics. Absorption and refraction in layers obtained from mixtures of colloid solutions may assume various vales within the limits determined by the original components. Mixing various colloid systems and forming mixed supramolecular complexes is possible due to coincidence of one of the parameters of molecules from different organic compounds. Further formation of three-dimensional crystal from a wet layer during drying happens significantly easier.

Control over the thickness of coating is performed by controlling content of solid matter in the depositing solution. Technological parameter in forming such layers will be the concentration of solution, which is conveniently controlled during fabrication.

The degree of crystallinity of the layer may be controlled with roentgenogram or with optical methods.

The other layers in the multilayer structure may be formed from various materials—organic or inorganic, with certain refraction parameter: $Al_2O_3$ (refraction index n=1.59), $SiO_2$ (1.46), $TiO_2$ (2.2–2.6), $MgF_2$ (1.38) and other. The said layers are obtained on different substrates using thermal evaporation of the material with its subsequent precipitation on the surface of the substrate; chemical precipitation from solution; cathode dispersion or chemical reaction of the substrate material with a selected material. Besides that, these layers may perform additional functions in the structure, such as protective, smoothing, adhesive and others.

BRIEF DESCRIPTION OF THE DRAWINGS

The invention will be more clearly understood from the following detailed description when read in conjunction with the accompanying drawings in which:

FIGS. 1 and 2 schematically present some of the possible variants of directions of dipole moments of the optical transitions of molecules in the crystalline structure of the optically anisotropic layer and the corresponding ellipses of the imaginary and the real parts of the refraction index of the layer.

DETAILED DESCRIPTION OF THE PRESENT INVENTION

A significant element in the disclosed multilayer structure, due to which the technical result is achieved, is at least one optically anisotropic layer that is at least partially crystalline. Optical anisotropy of the said layer is described by the ellipses of the imaginary and the real parts of the refraction index. The main axes of the ellipses of the imaginary and the real parts of the refraction index here are codirectional, but generally directed arbitrarily relative to the coordinate system (FIG. 1), X Y Z associated with the substrate (or the foregoing layer in the multilayer structure). In the coordinate system X Y Z, the Z-axis is directed along the normal to the substrate 1, while X-axis is directed along the direction of the external aligning action 2. The Y-axis is directed perpendicular to the plane XZ. The direction of the X-axis does not necessarily coincide with the direction of the minor axis $(n_3, k_3)$ of the ellipsoid. The minor axis, as a rule, is directed perpendicularly to the plane of molecules or flat fragments of molecules. The major axis $(n_1, k_1)$, then, is directed along the primary orientation of the dipole moments of the optical transition of molecules. In case of polycrystalline structure of the layer, direction of axes $(n_1, k_1)$, $(n_2, k_2)$ and $(n_3, k_3)$ of the ellipsoids may vary for different areas of the layer (different domains).

Absorption coefficient $k_3$ along the axis $(n_3, k_3)$ has the minimum value; and for the multilayer structure used in the capacity of the polarizer it is preferred that it would approach zero. The axis $(n_1, k_1)$ coincides with the direction, along which the absorption coefficient $k_1$ is maximum. Also, it should be noted that lowering $k_1$ will lead to an increase of $k_2$, since this involves reorientation of the dipole moments of optical transition, which is accompanied by some disorientation of molecules in the plane $(n_1, k_1-n_2, k_2)$.

Providing the necessary anisotropy of absorption and refraction coefficients, as well as orientation of the main axes is possible via imposing certain angular distribution of molecules in the polarizing film on the surface of the substrate. If the distribution function is symmetrical relative to the direction of deposition of the polarizer and the normal to the substrate (FIG. 2), the axes $(n_1, k_1)$ and $(n_3, k_3)$ of ellipse of the absorption coefficient will coincide with those directions, i.e. axes X and Z, while the third axis will be directed perpendicular to them (Y-axis). The axis of minimal absorption then will be the X-axis, while the Y-axis—maximum absorption. In case of asymmetrical angular distribution, the direction of axes may not coincide with the mentioned directions. Thus, via selecting regime of fabricating the anisotropic layer one may obtain crystalline layer with various optical properties.

Figure 3:
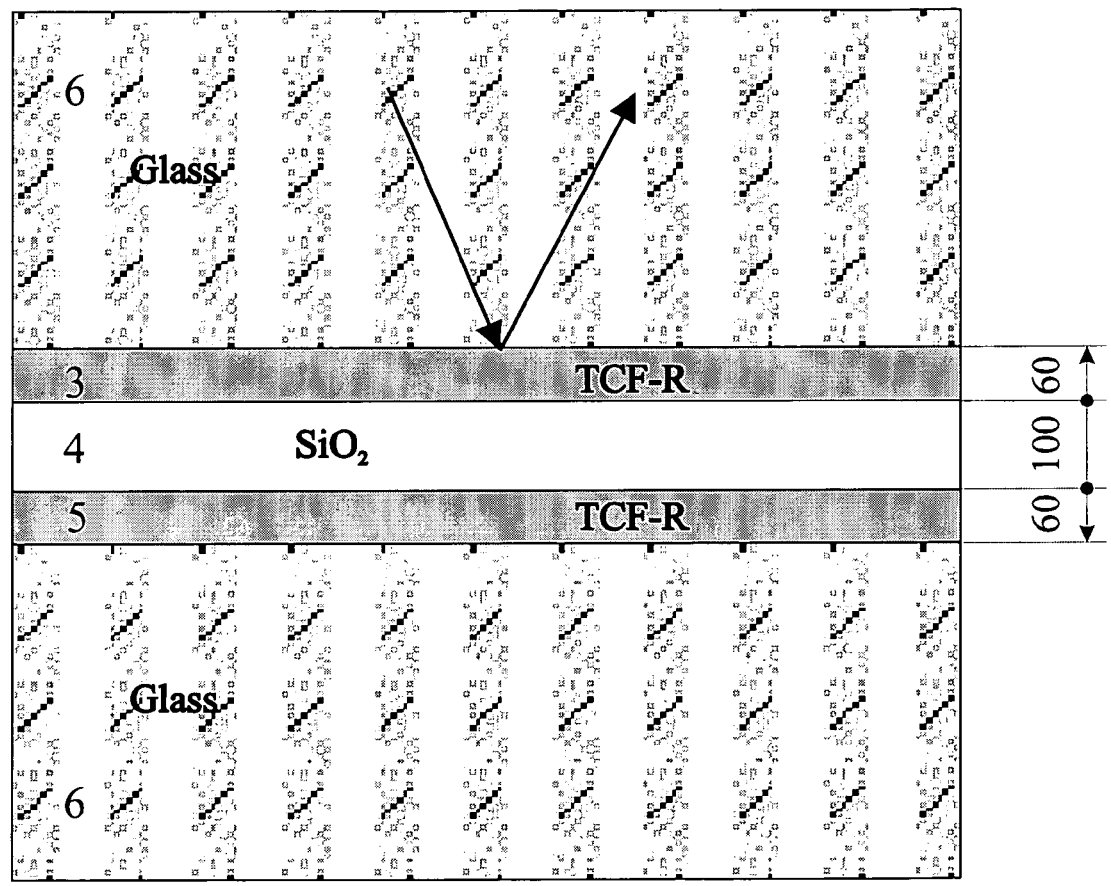
FIG. 3 presents the multilayer structure according to the disclosed invention, described in the example of embodiment.
Figure 4:
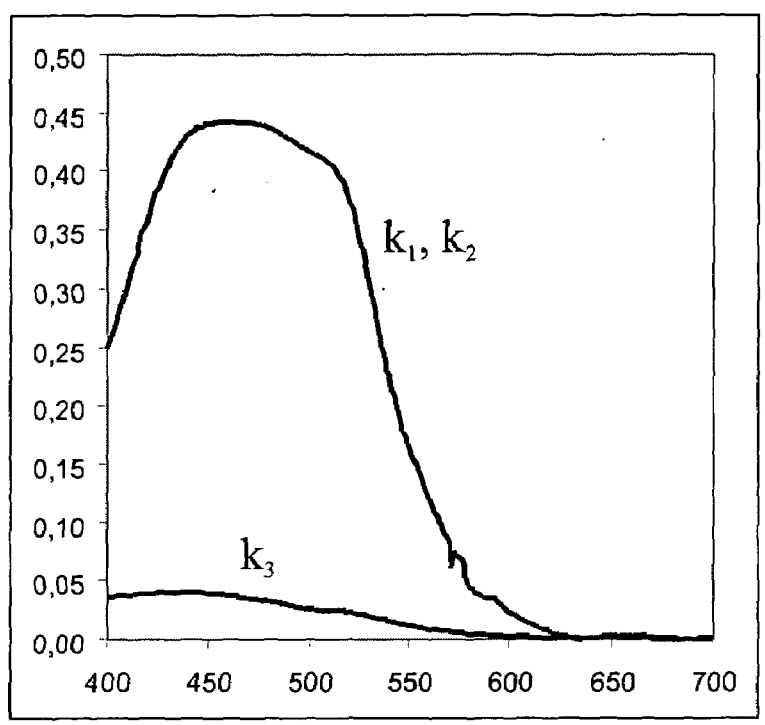
FIGS. 4 and 5 present spectral dependences of the imaginary and the real parts of the refraction index of the layer included in the multilayer structure.
Figure 5:
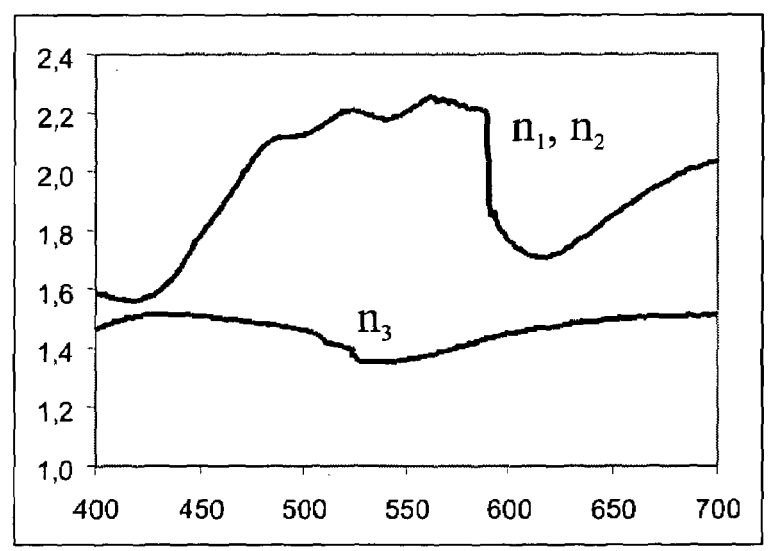

The herein invention has been implemented in fabricating a multilayer optical structure, which functions simultaneously as reflecting polarizer and color edge filter in a display. The multilayer structure included three layers (FIG. 3): the first layer, along the direction of the incident light, was the optically anisotropic crystalline layer (TCF-R) 3; the second was —$S_iO_24$; and the third was the optically anisotropic layer 5 analogous to the first one; the assembly was encased by glass plates 6 from both sides. Optically anisotropic layers 3 and 5 were formed out of 7.5% aqueous solution (LLC, or lyotropic liquid crystal) of a mixture of cis- and transisomers of dibenzoimidazole naphthalenetetracarboxilic acid. FIGS. 4 and 5 present spectral dependences of the imaginary and the real parts of the refraction index of the anisotropic layer 3, accordingly.

The multilayer structure (FIG. 3) has been obtained in the following way. Initially, anisotropic layer 5 TCF-R with thickness of 60 nm has been formed on the glass substrate 6 via deposition of LLC, its alignment and subsequent removing of the solvent. Then, the layer 4 of SiO2 (n=1.51) with thickness of 100 nm was deposited, and another anisotropic layer 3 TCF-R with thickness of 60 nm was deposited such that the directions of the optical axes of the first and the second anisotropic layers would coincide. On the top, optically anisotropic multilayer structure was covered with the other glass plate 6.

Figure 6:
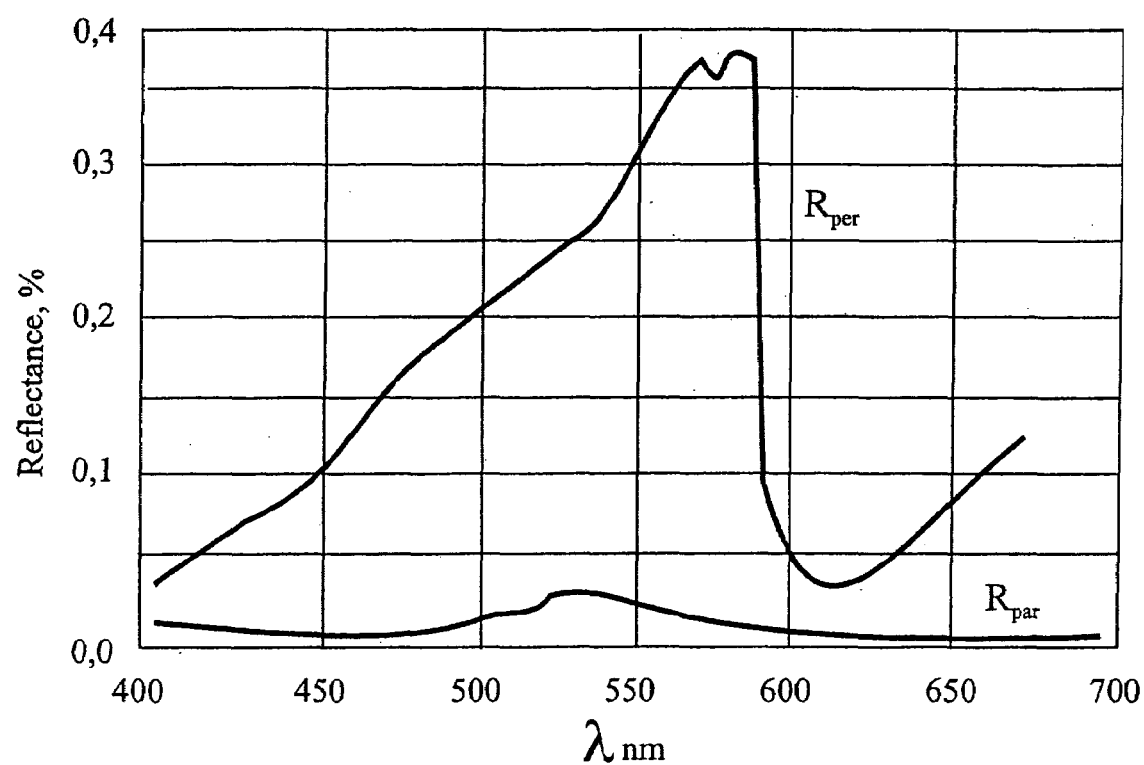
FIG. 6 presents the spectra of reflection of light from the multilayer structure for the two different directions of polarization.

FIG. 6 presents the spectra of reflection of light by the above-described structure with two different directions of polarization of the incident radiation ($R_{per}$ and $R_{par}$ accordingly).

The herein described optically anisotropic structure is an effective reflecting polarizer of green light (wavelength range 530–590 nm) with sharp cutoff in the long-wavelength region of the spectrum. Moreover, the low reflection coefficients in the long-wavelength region ($\lambda$>600 nm) are due to the decrease of differences between the refraction indexes in different layers of the structure in that region of the spectrum, while in the short-wavelength region ($\lambda$<500 nm) it is due to the presence of the of the absorption band in the anisotropic layer. Besides that, this structure serves its functional purpose at incident angles significantly deviating from the normal.

The foregoing example is a particular case of embodiment and does not limit all possibilities of implementation of the disclosed invention characterized in the herein claims.

Therefore, it is possible to fabricate multilayer structures with optically anisotropic layers featuring high degree of anisotropy, high refraction indexes (for at least one direction of the optical axis) with a possibility of selecting the required optical characteristics by using technologically simple and ecologically safe methods. The fabricated layers appear as dense films with smooth surfaces not requiring any additional processing.

References:
[1] N. P. Gvozdeva et al., Fisichaskaya optika, M.: Mashinostroenie, 1991.
[2] U.S. Pat. No. 5,007,942
[3] WO 95/17691
[4] WO 99/31535
[5] RU 2155978 (PCT publication in Russian—WO 00/25155)

What is claimed is:

1. Multilayer optically anisotropic structure comprising at least several layers, refraction indexes of which in at least one region of the spectrum of light, their thickness and their combination is selected such as to provide an interference extremum for at least one polarization of light in the said region of the spectrum and on at least one side of the multilayer optical structure, wherein at least one of the layers is optically anisotropic and has been made out of at least one organic material, molecules or fragments of molecules of which have flat build and where at least a part of the said layer has crystalline structure, while the following relationships are true for the main axes of ellipsoids of the imaginary and the real parts of the refraction index of the anisotropic layer in the region of at least one of the absorption bands of the layer's material on an area with linear dimension no less than the wavelength of the maximum of at least one absorption band:

$K_1 \geq K_2 > K_3$, $(n_1+n_2)/2 > n_3$, where, $K_1$, $K_2$, $K_3$ and $n_1$, $n_2$, $n_3$—are the main values of the axes of ellipsoids of the imaginary and the real parts, accordingly, of the refraction index of the anisotropic layer.

2. Multilayer optically anisotropic structure according to claim 1, wherein the following relationship holds for the main values of the axes of ellipsoids of the imaginary and real parts of the refraction index:

$K_3 < 0.2 * K_1$.

3. Multilayer optically anisotropic structure according to any of claims 1–2, wherein the directions, which correspond to the maximum or minimum value of the main values of the axes of ellipsoids of the imaginary and the real parts of the refraction index of the anisotropic layer lay in the plane parallel to the plane of the substrate or to at least one of the layer in the structure.

4. Multilayer optically anisotropic structure according to any of claims 1–2, wherein in the capacity of the organic material of the optically anisotropic layer one uses at least one organic material, chemical formula of which contains at least one ionogenic group, which provides its solubility in polar solvents in order to form stable lyotropic liquid crystal phase and/or at least one non-ionogenic group, which provides its solubility in non-polar solvents in order to form stable lyotropic liquid crystal phase, or at least one anti-ion, which in the process of formation of the anisotropically absorbing film either remain in the structure of molecules or not.

5. Multilayer optically anisotropic structure according to any of claims 1–2, wherein in the capacity of the organic material one uses at least one organic dye capable of absorbing light in at least one of the specified spectral ranges from 200 to 400 nm, from 400 to 700 nm and from 0.7 to 13 µm.

6. Multilayer optically anisotropic structure according to any of claims 1–2, wherein the anisotropic layer is formed by a multitude of supramolecular complexes of one or several organic materials.

7. Multilayer optically anisotropic structure according to any of claims 1–2, wherein the organic material used is a mixture of at least two dyes, molecules or fragments of molecules of which have one of dimensions equal to 3.4±0.2 A.

8. Multilayer optically anisotropic structure according to any of claims 1–2, wherein in the capacity of the optically anisotropic layer it contains at least one polarizing layer, or at least one layer of conducting material, or at least one phase-shifting layer, or at least one alignment layer, or at least one protective layer or at least one mirror-like or diffusely reflecting layer, or at least one layer simultaneously functioning as a combination of at least two of the said layers.

9. Multilayer optically anisotropic structure according to any of claims 1–2, wherein it additionally contains at least one polarizing layer, or at least one layer of conducting material, or at least one phase-shifting layer, or at least one alignment layer, or at least one protective layer, or at least one layer of liquid crystal, or at least one mirror-like or diffusely reflecting layer, or at least one layer simultaneously functioning as a combination of at least two of the said layers.

10. Multilayer optically anisotropic structure according to any of claims 1–2, wherein the thickness of any of the layers in the structure does not exceed 10 µm.

11. Multilayer optically anisotropic structure according to any of claims 1–2, wherein the anisotropic layer borders two other layers in the structure or it borders a layer and substrate.

12. Multilayer optically anisotropic structure according to any of claims 1–2, wherein at least one refraction index of the anisotropic layer is greater than 2.2 in the region of the layer's transparency.

13. Multilayer optically anisotropic structure according to any of claims 1–2, which represents a polarizer or a brightening coating, or an interference-polarizing light filter, or a beam splitter, or a polarizing mirror.

* * * * *